(12) United States Patent
Caragiuli et al.

(10) Patent No.: US 10,942,092 B2
(45) Date of Patent: Mar. 9, 2021

(54) DEVICE FOR COLLECTING, TRANSFERRING AND STORING SAMPLES OF BIOLOGICAL AND/OR CHEMICAL MATERIAL

(71) Applicant: Copan Italia S.p.A., Brescia (IT)

(72) Inventors: Gabriele Caragiuli, Brescia (IT); Giorgio Martello, Brescia (IT); Andrea Taini, Brescia (IT)

(73) Assignee: Copan Italia S.p.A., Brescia (IT)

( * ) Notice: Subject to any disclaimer, the term of this patent is extended or adjusted under 35 U.S.C. 154(b) by 485 days.

(21) Appl. No.: 15/755,896

(22) PCT Filed: Aug. 18, 2016

(86) PCT No.: PCT/IB2016/054943
§ 371 (c)(1),
(2) Date: Feb. 27, 2018

(87) PCT Pub. No.: WO2017/033099
PCT Pub. Date: Mar. 2, 2017

(65) Prior Publication Data
US 2019/0033175 A1    Jan. 31, 2019

(30) Foreign Application Priority Data
Aug. 27, 2015   (IT) ................. 102015000046892

(51) Int. Cl.
*G01N 1/02* (2006.01)
*B01L 3/00* (2006.01)

(52) U.S. Cl.
CPC .............. *G01N 1/02* (2013.01); *B01L 3/5082* (2013.01); *B01L 2200/02* (2013.01); *B01L 2200/141* (2013.01); *G01N 2001/028* (2013.01)

(58) Field of Classification Search
CPC .. G01N 1/02; G01N 2001/028; B01L 3/5082; B01L 2200/02; B01L 2200/141
See application file for complete search history.

(56) References Cited

U.S. PATENT DOCUMENTS 9,027,420 B1    5/2015  Ward

FOREIGN PATENT DOCUMENTS

| EP | 2641545 A1 | 9/2013 |
|---|---|---|
| EP | 1608268 | 3/2016 |

(Continued)

OTHER PUBLICATIONS

English translation for JP3159968U (see attached English translatioin). (Year: 2010).*

(Continued)

*Primary Examiner* — Xin Y Zhong
(74) *Attorney, Agent, or Firm* — Fish & Richardson P.C.

(57) ABSTRACT

The concepts herein relate to a device for collecting, transferring and storing samples of biological and/or chemical material. The device includes a support body extending along a main longitudinal direction between a first and a second end opposite each other and a collecting portion engaged with one of said ends of the support body and suitable for collecting an amount of a sample of biological and/or chemical material. The support body is defined by at least a first sub-body and a second sub-body extending longitudinally and configured to be selectively engaged and separated with and from each other. The support body is configured to operate between an assembled condition, wherein the first and the second sub-body are engaged with each other, and a separated condition, wherein the first and the second sub-body are separated and bear, respectively, a first and a second sub-collecting portion of the collecting portion.

19 Claims, 4 Drawing Sheets

(56) References Cited

FOREIGN PATENT DOCUMENTS

| JP | 2121870 | | 10/1990 |
|---|---|---|---|
| JP | 3159968 U | | 5/2010 |
| JP | 3159968 U | * | 6/2010 |
| WO | WO2014049460 | | 4/2014 |
| WO | 2014207598 A1 | | 12/2014 |

OTHER PUBLICATIONS

PCT International Search Report and Written Opinion of the International Searching Authority, PCT/162016/054943, dated Dec. 6, 2016, 9 pages.

\* cited by examiner

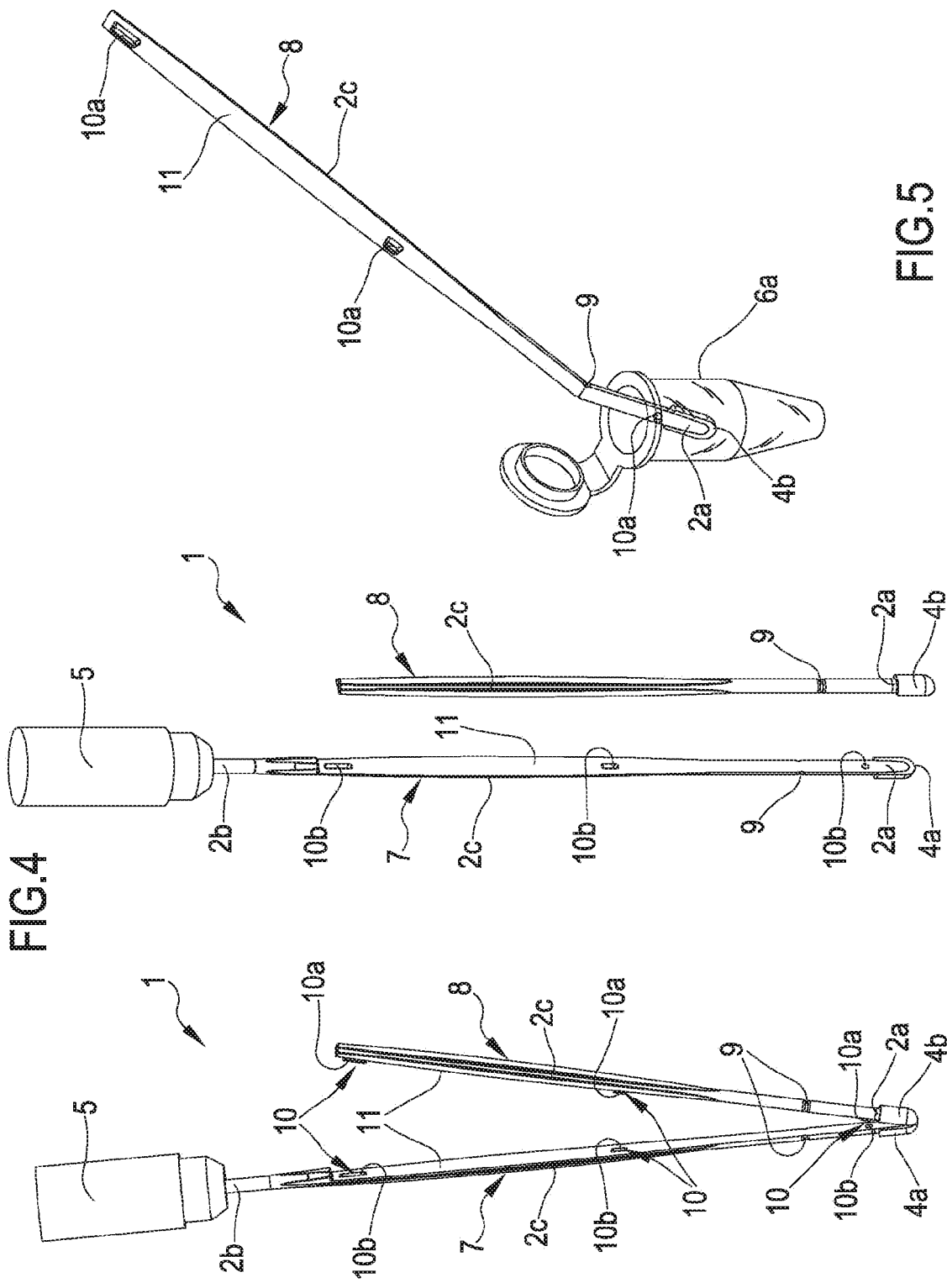

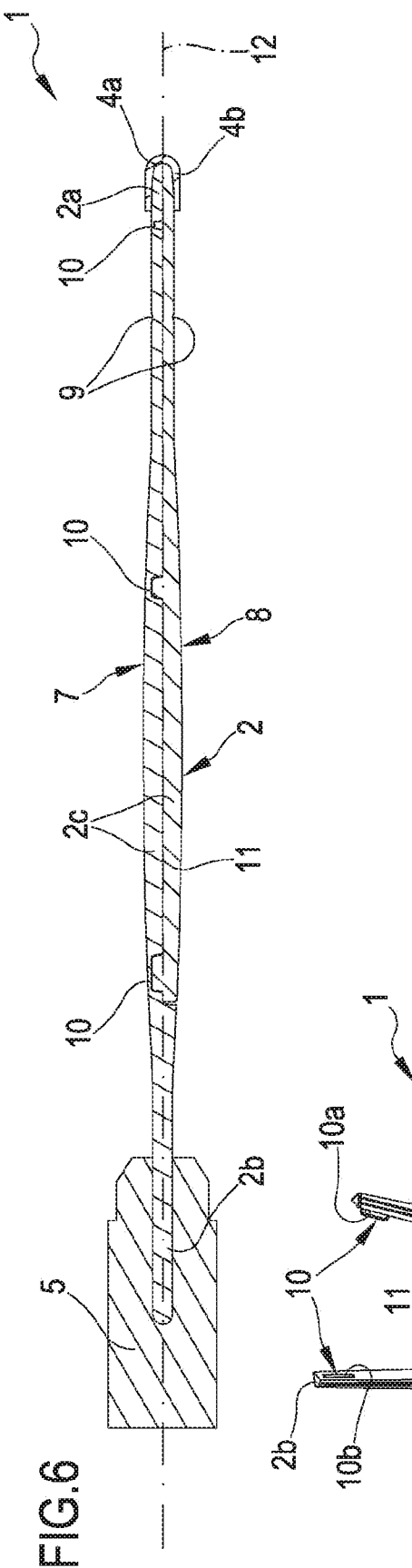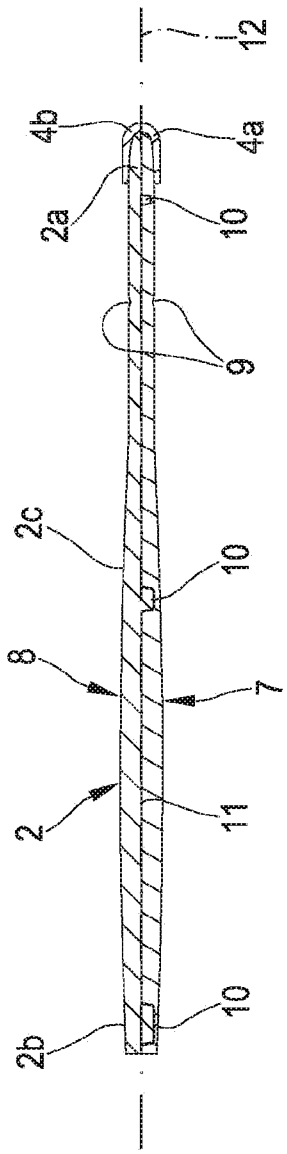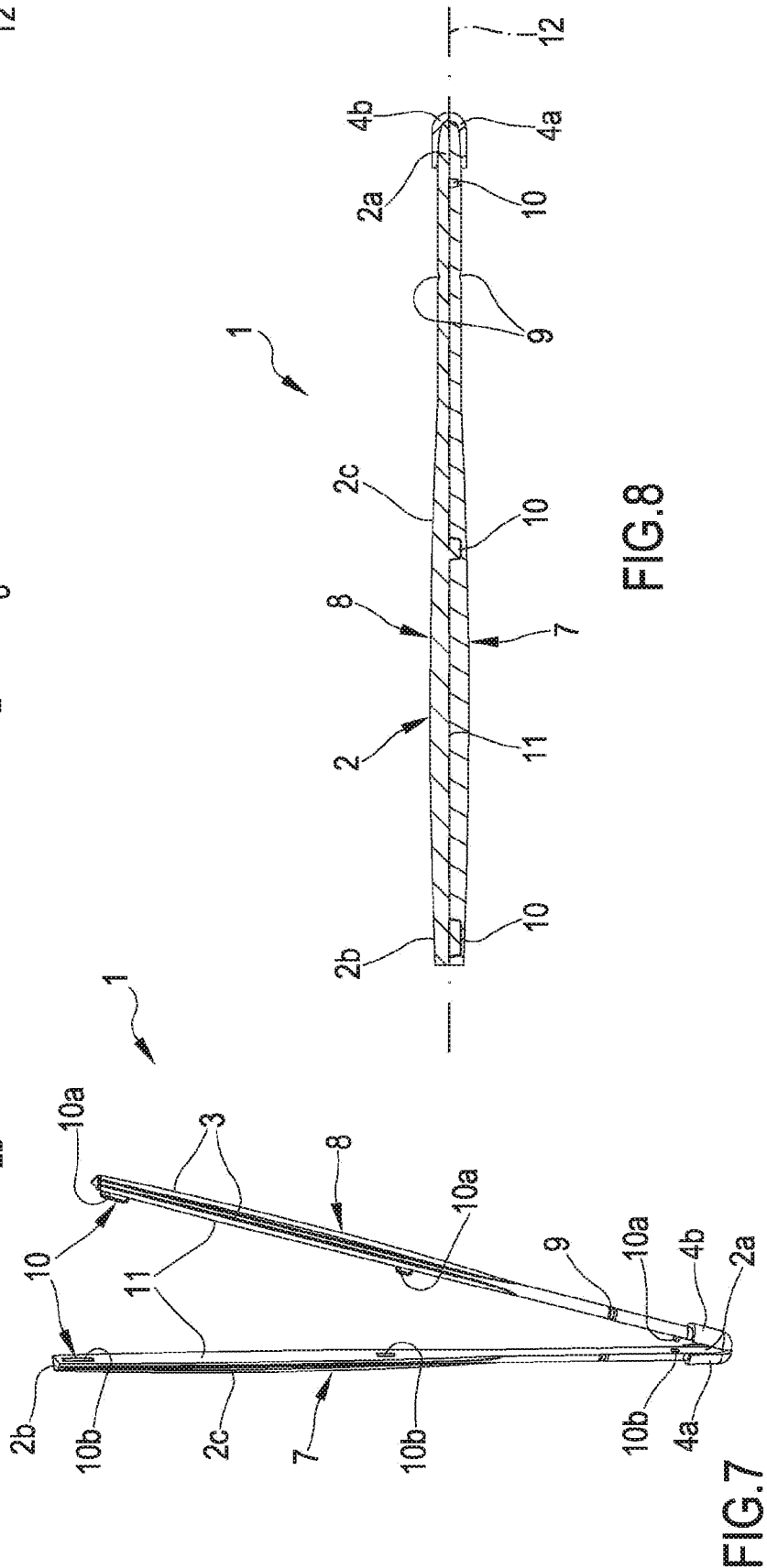
FIG.6
FIG.7
FIG.8

DEVICE FOR COLLECTING, TRANSFERRING AND STORING SAMPLES OF BIOLOGICAL AND/OR CHEMICAL MATERIAL

CROSS-REFERENCE TO RELATED APPLICATIONS

This application is a U.S. National Phase application under U.S.C. § 371 and claims the benefit of priority to International Application No. PCT/IB2016/054943, filed Aug. 18, 2016, which claims priority to Italian Patent Application No. IT102015000046892, filed Aug. 27, 2015, the contents of which are hereby incorporated by reference.

The concepts herein relate to a device for collecting, transferring and storing samples of biological and chemical material. The concepts herein further relate to a process for manufacturing said device, a use of the device and a method for collecting, transferring and storing samples of biological and/or chemical material by using said device. The device is preferably in the form of a swab. The concepts herein have application, for example, for the collection, transfer and storage of biological material drawn directly from the human body or for environmental sampling of varying nature. The concepts herein have particular application in the forensic field, where it is necessary to ensure correct storage and complete traceability of samples of biological and/or chemical material, retrieved, for example, from crime scenes, and it is in particular of fundamental importance to ensure that the same samples collected and already analysed through a first series of analyses are also made available for subsequent analyses conducted even a long time after the sample itself was collected (even years). This becomes necessary, for example, in cases in which a judicial authority orders, at a later moment in time, that further analyses be conducted to verify and cross-check the results obtained from analyses performed at an earlier moment in time.

The use of various types of devices for collecting and transferring analytes such as organic or biological substances, for example to be subsequently subjected to analytical or diagnostic laboratory tests, is known in the prior art. For example, there are known swabs consisting of a stem with a quantity of cotton fibre wrapped around one end which defines a collecting portion suitable for absorbing within it the sample to be collected. Such devices tend to retain the sample inside the collecting portion and release only a limited percentage of the sample for analytical purposes. There are also known swabs provided with collecting portions made of absorbing materials, such as sponge or polymeric materials capable of absorbing the samples to be collected. Flocked swabs comprising an elongate support body and a plurality of flocked fibres at one end of the support which define a flocked fibre collecting portion for analytes or biological material are also known from patent EP1608268 belonging to the Applicant of the present application. Said flocked swabs enable the release of a very high percentage of the biological or chemical material absorbed. The above-described swabs have elongate stems generally made of plastic materials, for example polystyrene, which are more or less flexible according to the specific application. The known swabs sometimes have predetermined breakage points positioned in an intermediate portion of the elongate stem and specifically provided to enable the stem to be broken in a precise desired point in order to allow the storage or transport of the collecting portion alone without the remaining grip part, for example to allow the collecting portion to be inserted in test tubes of a reduced size, or other containers for transport or analysis. In other cases the stem is cut manually or automatically to facilitate the controlled breakage thereof at the appropriate moment. The known swabs described above have some limitations in the case of specific applications, such as, for example, the use thereof to collect samples from crime scenes, where it is necessary to be able to analyse part of the biological and/or chemical sample collected at a first moment in time, while preserving another part of the same collected sample to enable full traceability of the sample and the performance of verifications, if necessary, on the same sample at a later moment in time, even long afterward. Essentially, it is a matter of responding to the need for test repeatability, a critical and frequent issue in the judicial and forensic realms. It is known that the collecting portion of the device can be treated, for example, with liquids or other substances in order to extract the largest possible quantity of biological and/or chemical sample from it and enable the necessary analyses to be performed on the sample, but this process precludes preserving part of the same sample for future use, since once the sample has been extracted from the collecting portion there is no longer any guarantee that the sample itself will remain intact and in conformity with or substantially equivalent to the originally collected one. In an attempt to overcome such limitations, a manual process is known, for example, which consists in scraping a part of the fibre of the flocked portion of the device (or removing, in a similar manner, a part of the enveloping cotton fibre or sponge defining the collecting portion), so as to subject only the fibres or sponge portions scraped away from the collecting portion and separated from the stem to the extraction process, while preserving the remaining part of the device and collecting portion for future use. This solution has some limitations, however, for example: a risk of contamination of the sample, a risk of contamination of the environments in which the process is carried out, the possibility of human error, the risk of having to repeat the procedure more than once if the fibre part removed manually does not contain a sufficient amount of biological and/or chemical sample, the need for considerable manual skill and experience on the part of the personnel involved in the operation and the laboriousness and cost connected to the manual operations and the associated materials (single-use) necessary. Furthermore, it is an inefficient, costly process and also poses the opposite risk of removing an excessive amount of sample and not keeping a sufficient amount for a future use. Furthermore, the process does not ensure a sufficiently high level of sample traceability as is required in criminal proceedings, in the context of which samples for forensic purposes are normally collected.

A further solution is also known from document WO2014/207598, belonging to the Applicant of the present application; it envisages providing, on the stem of a flocked device, a weakened zone positioned in the flocked collecting portion of the device, aimed at facilitating the selective breakage of the stem in the flocked portion and the separation of the same flocked portion into two parts. However, this solution, despite being satisfactory for use for other purposes, does not enable all the limitations identified above to be overcome. In certain instances, the concepts herein resolve one or more of the problems found in the prior art. Other objects of the concepts herein are to propose a device for collecting, transferring and storing samples of biological and chemical material, a process for the manufacture thereof, and a method for collecting, transferring and storing samples of biological and chemical material, which:

enable and simplify the storage of an appropriate amount of biological and/or chemical sample for the performance of analyses at different moments in time, also with very long time intervals between one analysis and the other; and/or guarantee a high degree of traceability and correct storage of the biological and/or chemical material even for long periods; and/or reduce the necessity of handling and the risk of contamination of the samples collected and of the work environments of the personnel involved in processing the samples; and/or increase the efficiency, safety and reliability of processing of the biological and/or chemical samples collected; and/or are highly flexible and highly convenient to use; and/or are simple and economical to implement.

These objects and others besides, which will become more apparent from the following description, are substantially achieved by a device, a process for manufacturing a device and a method for collecting, transferring and storing samples of biological and chemical material by said device, in accordance with what is expressed in one or more of the appended claims, taken on their own or in combination with one another, and/or in combination with any of the aspects set forth below.

In one aspect, a device for collecting, transferring and storing samples of biological and/or chemical material is in the form of a swab.

In a further aspect, a support body of the device is in the form of a stem.

In a further aspect, a device for collecting, transferring and storing samples of biological and/or chemical material has a first sub-body and a second sub-body configured to be separable by rotating the first sub-body relative to the second sub-body around a rotation pin.

In a further aspect, due to a lever effect, this rotation causes the separation of the first sub-body relative to the second sub-body and/or the progressive separation of the two sub-collecting portions.

In a further aspect, the device has a first sub-body and a second sub-body configured to be separable by progressive distancing of the first sub-body relative to the second sub-body starting from an area of the first sub-body or of the second sub-body opposite to a collecting portion of the sample.

In a further aspect, a main longitudinal direction of the support body coincides with a central axis of longitudinal extension or axis of symmetry of the support body.

In a further aspect, bending causes the separation of the first sub-body relative to the second sub-body and/or the progressive separation of the two sub-collecting portions.

In a further aspect, the first sub-body and the second sub-body are configured to be separable at least partially by bending at least a part of the first sub-body or of the second sub-body.

In a further aspect, the bending causes the separation of the first sub-body relative to the second sub-body and/or the progressive separation of the two sub-collecting portions.

In a further aspect, the first and the second sub-body are configured to be selectively separable and coupled on respective contact surfaces or respective flat contact surfaces perpendicular to the main longitudinal direction.

In a further aspect, the first sub-body and the second sub-body can be selectively coupled and separated according to an assembling direction parallel to or coinciding with said main longitudinal direction.

In a further aspect, the first sub-body extends longitudinally along said main longitudinal direction solely in a part of the first end of the support body and/or a part of the collecting portion, the remaining parts of the support body being defined solely by the second sub-body, or vice versa.

In a further aspect the first sub-body extends longitudinally along said main longitudinal direction solely at the first end of the support body and/or the collecting portion, the remaining parts of the support body being defined solely by the second sub-body, or vice versa.

In a further aspect, a longitudinal portion of the support body consists solely of the second sub-body.

In a further aspect, another longitudinal portion of the support body consists solely of the second sub-body In a further aspect, the length of the support body corresponds to the sum of the lengths of the first sub-body and second sub-body.

In a further aspect, the first sub-body and the second sub-body both extend at least along the first end of the support body or at least along the collecting portion.

In a further aspect, the first sub-body and the second sub-body both extend at least from the first end of the support body to the intermediate portion of the support body.

In a further aspect, the first sub-body and the second sub-body both extend at least from the first end of the support body to the second end of the support body.

In a further aspect, the collecting portion comprises an absorbent sponge material.

In a further aspect, the collecting portion comprises an absorbent polymeric material.

In a further aspect, the absorbing material is fixed to the first end of the support body by an adhesive.

In a further aspect, the absorbing material is fixed to the first end of the support body by temporary heating of at least the first end of the support body and/or of the absorbing material, without the use of an adhesive.

In a further aspect, the first and the second sub-body have respective engaging elements of the press fit or snap fit or interference fit type.

In a further aspect, the engaging elements comprise one or more housing seats formed at least on the first sub-body and one or more protrusions formed at least on the second sub-body, or vice versa, each protrusion being suitable for being engaged inside a respective housing seat in the assembled condition of the support body.

In a further aspect, the first and the second sub-body have an elongate conformation.

In a further aspect, the first and/or the second sub-body have a weakened portion configured to enable the separation, from an intermediate portion of the support body of the device, of an end portion of the first and/or of the second sub-body bearing a respective sub-portion of the collecting portion.

In a further aspect, the device comprises a gripping portion engaged with the support body at the second end of the support body, the gripping portion being solidly joined, in the separated condition of the support body, to the first sub-body and/or second sub-body of the support body.

In a further aspect, the first and the second sub-body are configured to be separated along a separation surface defined on the first and the second sub-body and extending longitudinally for at least half or for at least three quarters of the length of the support body.

In a further aspect, the separation surface extends longitudinally for the entire length of the support body.

In a further aspect, the separation surface extends longitudinally only for part of the length of the support body and along the internal length of the first sub-body or of the second sub-body.

In a further aspect, the separation surface extends seamlessly between the first and the second end of the support body.

In a further aspect, the first and the second sub-body are made of plastic material.

In a further aspect, the entire support body is made of plastic material.

In a further aspect, the sub-amounts of biological sample are half-amounts of biological sample.

In a further aspect, the concepts herein relate to a use of a device, according to any one of the appended claims, for collecting biological or chemical material for forensic purposes and/or from crime scenes, or for environmental sampling, or for collecting samples from a human or animal body and/or from a human or animal orifice, in particular for collecting samples from the mouth, pharynx, nasal cavity, eyes, urethra, vagina, anus, rectum, or skin.

In a further aspect, a use of the device for collecting, transferring and storing samples of biological and/or chemical material comprises the step of collecting the sample at least at an end tip of the collecting portion.

In a further aspect, the use of the device comprises a step of collecting the sample in a substantially uniform manner at least on the end tip of the collecting portion, in such a way that the first and second sub-collecting portions are both provided with a sufficient amount of collected sample for conducting analyses of the sample and/or are similar to each other or substantially analogous.

In a further aspect, the use of the device further comprises a step of dehydrating the sample collected on the collecting portion.

In a further aspect, the use of the device further comprises a step of separating the second sub-body of the support body from the first sub-body of the support body, this separation further causing the separation of a second sub-collecting portion from a first sub-collecting portion.

In a further aspect, the use of the device further comprises a step of subjecting a sample present on the first sub-collecting portion to a process of analysis and a step of storing the second sub-collecting portion for sample traceability purposes and for a possible subsequent analytical use, or vice versa.

In a further aspect, there is provided a kit for collecting, transporting and storing samples of biological or chemical material, comprising a device according to any one of the appended device claims or above-described aspects, and further comprising one or more containers or test tubes for housing, transporting and/or storing at least the first and/or the second sub-collecting portion.

In a further aspect, the kit further comprises a dehydrating element that can be associated with the device for at least a predetermined period of time in order to dehydrate the sample present on the collecting portion of the device.

In a further aspect, a process for manufacturing a device for collecting, transferring and storing samples of biological and/or chemical material, according to any one of the appended device claims or above-described aspects, comprises at least a step of making the first sub-body and the second sub-body by moulding.

In a further aspect, the manufacturing process comprises a step of making the first sub-body and the second sub-body by injection moulding.

In a further aspect, the manufacturing process comprises a step of making the first sub-body and the second sub-body as distinct elements both extending longitudinally along a main longitudinal direction of the support body of the device.

In a further aspect, the manufacturing process further comprises a step of applying an amount of adhesive material on a first end of the support body and a step of applying an absorbing material on the first end of the support body to define the collecting portion.

In a further aspect, the manufacturing process further comprises a step of heating at least a first end of the support body and/or an absorbing material and a step of applying the absorbing material on the first end of the support body so as to bring about a stable coupling of the absorbing material to the first end of the support body and define the collecting portion.

In a further aspect, the manufacturing process further comprises a step of applying an amount of adhesive material on a first end of the support body and a step of making a layer of flocked fibre on the first end of the support body so as to define the collecting portion.

In a further aspect of the manufacturing process, the step of making a collecting portion is carried out by flocking.

In a further aspect of the manufacturing process, the step of making a collecting portion is carried out by flocking in an electrostatic field, whereby the fibres are arranged in an ordered manner on the surface of the first end of the support body and/or are arranged, during the deposition process, substantially perpendicularly to the surface itself.

In a further aspect, a method for collecting, transferring and storing samples of biological and chemical material by a device according to any one of the appended device claims or above-described aspects, further comprises a step of extracting at least a part of a first sub-amount of the sample from the first sub-collecting portion to enable analytical operations to be carried out on the biological sample at a first moment in time and a step of storing the second sub-amount of the sample on the second sub-collecting portion of the collecting portion for use at a second moment in time following the first moment in time.

In a further aspect, the method for collecting, transferring and storing samples of biological and chemical material comprises a separation between the first and the second sub-body, which takes place along a longitudinal separation surface of the support body.

In a further aspect, the method for collecting, transferring and storing samples of biological and chemical material comprises storing, over a period of time, the first sub-amount of the biological sample and/or the second sub-amount of the biological sample in a substantially dry and/or sterile environment or container.

By way of non-limiting example, a detailed description of one or more preferred embodiments of the concepts herein appears below, wherein:

FIG. 3 shows the device of FIG. 2, wherein a first sub-body and a second sub-body have been partially separated;

FIG. 4 shows the device of FIG. 3, wherein the first sub-body and the second sub-body have been completely separated;

FIG. 5 shows the second sub-body of the device of FIG. 3 having a first end provided with a sub-collecting portion inserted in an Eppendorf-type test tube, and wherein the second sub-body has been partially bent to enable the controlled breakage thereof in a weakened portion;

FIG. 6 shows a longitudinal sectional view of the device of FIG. 2;

FIG. 7 shows a variant of the device of FIG. 2, wherein the entire support body of the device is divided longitudinally into two sub-bodies that are in a condition of partial separation;

FIG. 8 shows a longitudinal sectional view of the device of FIG. 7 in the assembled condition, with the two sub-bodies mutually coupled;

Figure 1:
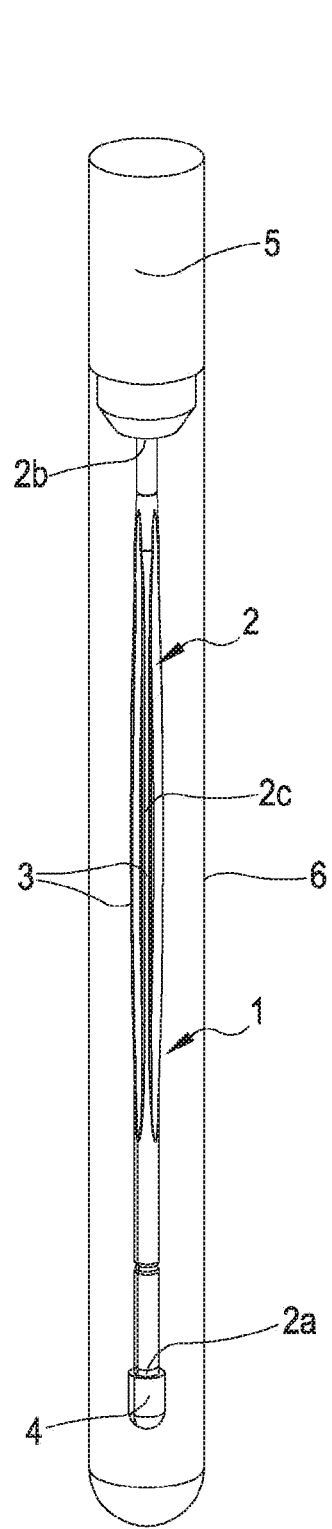
FIG. 1 represents a kit for collecting, transporting and storing samples of biological or chemical material, comprising a device and a container or test tube.

With reference to the figures, 1 denotes in its entirety a device for collecting, transferring and storing samples of biological and/or chemical material. In the present text "biological material" is understand to include microbiological material as well. Furthermore, the term "biological or chemical material" is understand to include in actual fact any type of analyte, such as, for example, but not only, microorganisms, antibodies/antigens, substances with an antimicrobial action, nucleotides, antibiotics, hormones, DNA sequences, enzymes, organic material, biological material or material of biological origin, enrichment supplements or selective supplements for culture media, and the like, as well as any type of chemical substance. Samples of varying nature intended for subsequent analysis in the clinical, chemical, biological, microbiological, environmental, genetic, forensic or other fields thus fall within this definition.

The device 1 comprises a support body 2, which extends along a main longitudinal direction 12 and has a substantially stem-like and/or elongate conformation along said main longitudinal direction 12. The support body 2 can be in the form of a stem as illustrated in the appended figures and can have any cross section size, also a variable one, along its longitudinal extent. The support body 2 has a first and a second end 2a, 2b, mutually opposite. The support body 2 can further have a plurality of reinforcement ribs 3 defined in an intermediate portion 2c positioned between the ends 2a, 2b.

The support body can be made of any material suited to the purpose. The support body is preferably made of plastic material, in particular a plastic polymer, for example copolyester, polystyrene, polyamide/nylon, etc.

The device 1 further comprises a collecting portion 4 configured to collect, for example to absorb or to collect by a mechanical action of rubbing or of another type, an amount of a sample of biological and/or chemical material. The collecting portion 4 is defined at the first end 2a of the support body 2. The collecting portion 4 can be of a known type. Preferably, the collecting portion 4 is of a flocked type and thus comprises a plurality of flocked fibres attached, for example by a suitable glue or by temporarily heating the plastic material of the support body, to the first end 2a. The layer of flocked fibres can be made, for example, by flocking in an electrostatic field, thanks to which the fibres are arranged in an ordered manner on the surface of the first end. The flocked portion can be made, for example, according to the teachings of the previously cited patent EP1608268 or the patent applications WO2014/049460 and WO2014/207598, all in the name of the Applicant of the present application, and whose contents related to the type of fibres used and conformation and characteristics of the layer of flocked fibres is incorporated herein by reference. Alternatively, the collecting portion 4 can comprise an element made of absorbing material. For example, the collecting portion 4 can be made of sponge material, polymeric material or another absorbing material suitable for collecting biological material. The collecting portion can be pre-treated by substances suitable for improving the preservation of the sample over time and/or preparing the sample for subsequent analyses. As illustrated in the figure, at the second end 2b of the support body 2 a gripping portion 5 can be defined, which is intended to simplify the handling of the device 1 itself. In one variant, the gripping portion can be hollow and contain a drying material. Preferably, the collecting portion 4 and the gripping portion 5 are defined at opposite ends of the device 1. As illustrated in FIG. 1, the gripping portion 5 can be suitable for acting as a cap for a container or test tube 6 in which the device can be positioned or stored before collection of the sample or also after collection of the sample.

The support body 2 further comprises a first and a second sub-body 7, 8. The first and the second sub-body 7, 8 preferably have an elongate conformation. The first and the second sub-body 7, 8 can extend longitudinally between the first and second ends 2a, 2b, as in the variant of FIGS. 7 and 8. Alternatively, in the variant illustrated in FIGS. 1 to 6, the first sub-body 7 can extend for the entire length of the support body 2, whereas the second sub-body can extend only from the first end 2a to a part of the intermediate portion 2c, or vice versa. The support body 2 can further comprise a weakened portion 9 defined near the collecting portion 4 to enable selective breakage of the support body 2. The weakened portion 9 can be configured to enable this selective breakage in the presence of a bending of the support body 2, at least when a certain radius of curvature is reached, as illustrated in FIG. 5 in relation to the second sub-body 8. As illustrated in FIGS. 3, 4 and 5, the weakened portion 9 can be defined both on the first sub-body 7 and on the second sub-body 8. The support body 2, and in particular the first and the second sub-body 7, 8, can be made of plastic material. Preferably, the first and the second sub-body 7, 8 are made separately by moulding, in particular injection moulding. The first and the second sub-body 7, 8 are configured to be selectively engaged and separated along at least a longitudinal portion of the support body 2. The engagement between the first and the second sub-body 7, 8 and the separation thereof are possible through a removable coupling, which can be for example in the form of engaging elements 10. In particular, the engaging elements 10 enable the support body 2 to operate between an assembled condition and a separated condition. In the assembled condition, illustrated for example in FIGS. 2, 6 and 8, the first and the second sub-body 7, 8 are engaged with each other; in contrast, in the separated condition, illustrated in FIG. 4, the first and the second sub-body 7, 8 are separated. FIGS. 3 and 7 show a condition of partial separation of the first and second sub-bodies 7, 8, in which the separation of the collecting portion 4 in the first sub-collecting portion 4a and second sub-collecting portion 4b is taking place.

The engaging elements 10 are preferably defined on the first and second sub-bodies 7, 8 and can be, for example, of the press fit or snap fit or interference fit type. In accordance with the embodiment shown in the appended figures, the engaging elements 10 comprise protrusions 10a and housing seats 10b for the protrusions 10a. Preferably, the housing seats 10b are of a shape mating that of the protrusions 10a. As illustrated in the appended figure, the housing seats 10b can be defined on the first sub-body 7 and the protrusions 10a can be defined on the second sub-body 8, or vice versa. Alternatively, the first sub-body 7 can comprise one or more housing seats 10b and one or more protrusions 10a and the second sub-body 8 can in turn comprise one or more protrusions 10a and one or more housing seats 10b suitable for cooperating respectively with the housing seats 10b and with the protrusions 10a of the first sub-body 7. The protrusions 10a and the housing seats 10b could also be alternated on the due sub-bodies 7, 8, in such a way that each of the two sub-bodies 7, 8 has both protrusions 10a and housing seats 10b. Preferably, the engaging elements 10 consist of protrusion-housing seat pairs; in other words, corresponding to each protrusion 10a there is a respective housing seat 10b. For example, the appended figures show a support body 2 endowed with three protrusion-housing seat pairs. The engaging elements 10 (and in particular the protrusion-housing seat pairs) can be defined in a plurality of sections of the first and second portions 7, 8. For example, as illustrated in FIG. 7, the engaging elements 10 can be defined near opposite ends of the first and/or of the second portion 7, 8 (i.e. near the ends 2a, 2b of the support body 2) and in an intermediate portion of the first and of the second portion 7, 8.

The support body 2 is configured to pass from the assembled condition to the separated condition via the manual action of an operator. In other words, it is the operator who, by acting manually on the support body 2, causes the separation of the first sub-body 7 from the second sub-body 8, or vice versa.

It is worth noting that, upon the passage from the assembled condition to the separated condition, a separation between the first and the second sub-body 7, 8 of the support body 2, and a separation between a first and a second sub-collecting portion 4a, 4b both take place. In particular, the separation of the collecting portion 4 takes place as the collecting portion 4 is engaged with the support body 2 both in the first sub-body 7 and the second sub-body 8 thereof and, consequently, when the portions 7, 8 separate, a first sub-collecting portion 4a is solidly joined to the first sub-body 7 and thus separates from a second sub-collecting portion 4b solidly joined to the second sub-body 8, as illustrated in FIGS. 3 and 7. For example, in the preferred embodiment, in which the collecting portion 4 is flocked, a plurality of fibres (which forms the first sub-collecting portion 4a) remains attached to the first sub-body 7 and a respective plurality of fibres (which forms the second sub-collecting portion 4b) remains attached to the second sub-body 8, with minimal or no dispersion of fibres, since all of the latter remain substantially attached to the first or to the second sub-collecting portion 4a, 4b because of the glue applied during the manufacturing phase, or because firmly connected to the material of the support body 2, heated in advance during the manufacturing phase.

Figure 9:
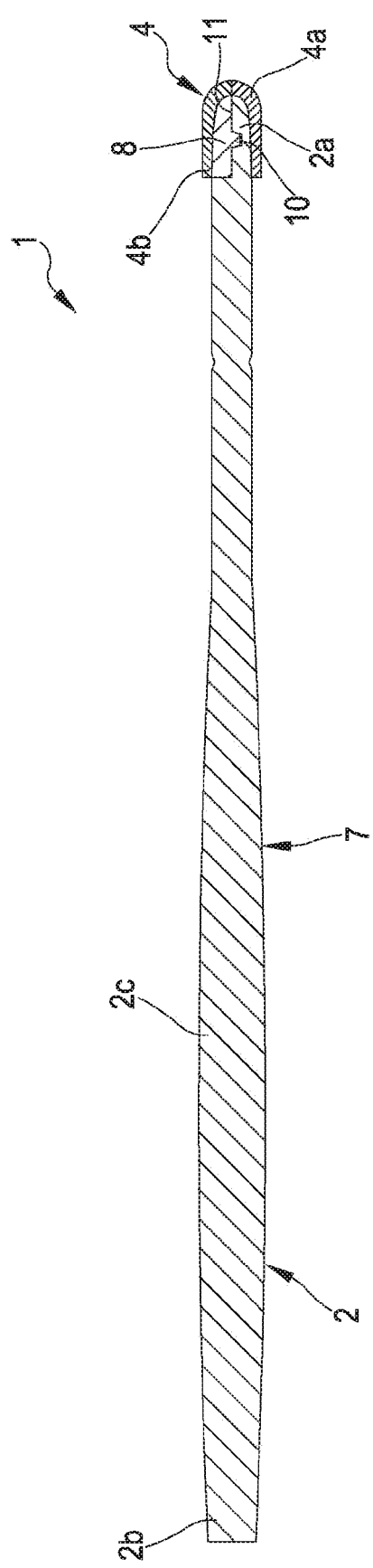
FIG. 9 shows a longitudinal sectional view of a third variant of the device, wherein the second sub-body extends longitudinally only in the collecting portion, whereas the remaining length of the support body is formed by the first sub-body, which also forms a part of the collecting portion.
Figure 10:
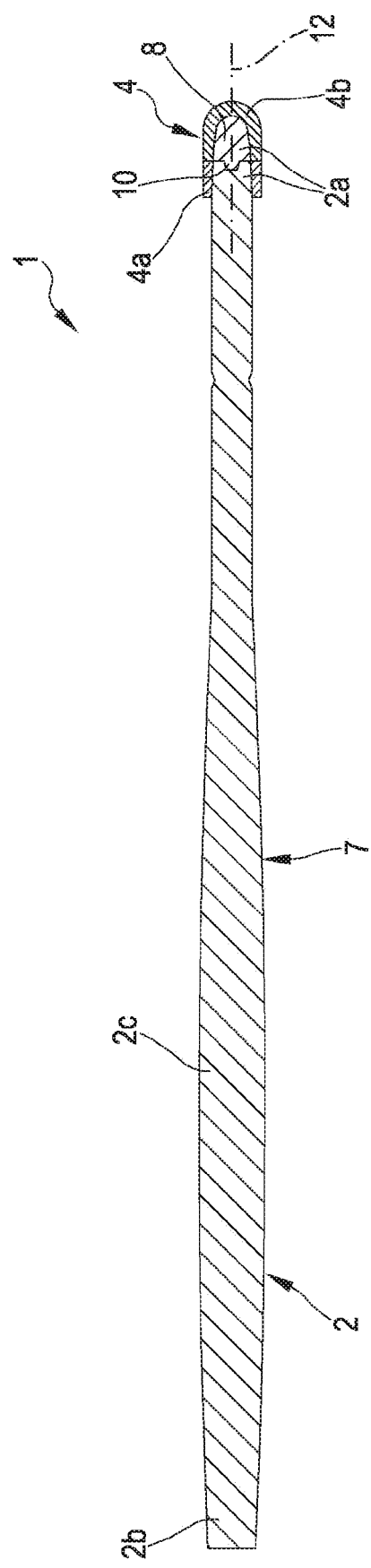
FIG. 10 shows a longitudinal sectional view of a fourth variant of the device, wherein the second sub-body extends only for part of a collecting portion and of a first end of the support body, and forms the terminal part of the first end, whereas the remaining length of the support body is formed by the first sub-body.

As illustrated in FIGS. 3 and 7, the first and the second sub-body 7, 8 are configured to be coupled and separated along respective contact surfaces 11, preferably consisting of flat contact surfaces 11. The contact surfaces 11 extend longitudinally along the main longitudinal direction in the first and second portions 7, 8 of the support body 2. As illustrated in FIGS. 3 and 6-8, the contact surfaces of the first and second portions 7, 8 can consist of flat surfaces which, in the assembled condition of the support body 2, are facing and in contact with each other. The contact surface 11 can extend for a length at least equal to half a length of the support body 2, as in the variant of the FIG. 1-6. The contact surface 11 can extend for a length at least equal to the entire length of the support body 2, as in the variant of the FIGS. 7 and 8. The contact surface 11 can extend for a length at least equal to the length of the collecting portion, as in the variant of FIG. 9. The contact surface 11 can extend perpendicularly to the main longitudinal direction and can coincide with a section of the support body perpendicular to the central axis 12, as in the variant of FIG. 10. In the variants of FIG. 9 and FIG. 10, the first sub-body 7 and/or the second sub-body 8 may be provided with protruding gripping elements to facilitate the detachment of the first sub-body 7 from the second sub-body 8.

In the variants of FIG. 9 and FIG. 10, it can become necessary or convenient to make use of instruments, for example provided with a blade, suitable for being inserted between the two sub-bodies 7,8 so as to facilitate the detachment thereof at the appropriate moment, with a consequent separation of the collecting portion and hence of the absorbing material.

The variant of FIG. 10 is less well suited for use in the forensic field, in which the collection of the sample in general takes place mainly at the tip of the device, whereas it is better suited for use in other fields (such as, for example, in the collection of samples in body cavities), in which collection of the sample takes place in the entire collecting portion.

In all of the variants illustrated, the separation of the two sub-bodies can take place both manually and in an automated by specific machinery.

Figure 2:
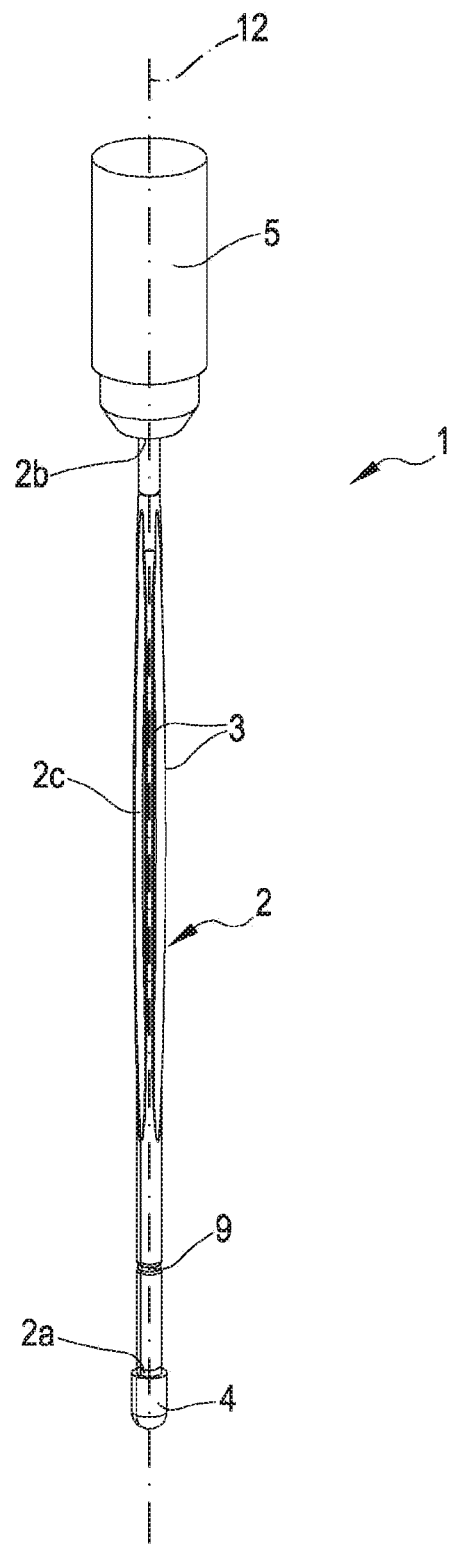
FIG. 2 shows a device for collecting, transferring and storing samples of biological and/or chemical material.

In the variant of FIGS. 1-6, the first and the second sub-body 7, 8 have a different longitudinal extent, since the first sub-body 7 extends for the whole length of the support body 2, whilst the second sub-body 8 extends only up to a part of the intermediate portion 2c. The second end 2b of the support body 2 thus consists entirely of the first sub-body 7. This variant enables the two sub-bodies 7, 8 to be easily separated simply by partially bending the first sub-body 7, which is capable of causing the protrusion 10a opposite the first end of the support body to come out of corresponding housing seat 10b. In the embodiment illustrated in FIGS. 7 and 8, the first and the second sub-body 7, 8 extend for a substantially analogous length and the contact surface 11 extends for the entire length of the support body 2. In this variant there could be provided suitable gripping elements (not illustrated) projecting from the first and from the second sub-body, offset relative to each other, in order to facilitate the gripping and manual separation of the two sub-bodies. Some possible modes of separation between the first and the second sub-body 7, 8 of the support body 2 will be described in greater detail below. The separation between the first sub-body 7 and the second sub-body 8 can be achieved, for example, by bending or moving by rotation the first sub-body 7 relative to the second sub-body 8, or vice versa. To separate the first and the second sub-body 7, 8, the operator grasps one end of the second sub-body 8 (preferably the end opposite the collecting portion 4) and moves it, bending it away from a corresponding end of the first sub-body 7. This movement causes the disengagement of the engaging elements 10 defined near said end and subsequently, as the second sub-body 8 continues to be moved away from the first sub-body 7, by virtue of a lever effect, and simply by a progressive detachment of the two sub-bodies 7,8, the first sub-collecting portion 4a is detached from the second sub-collecting portion 4b. The steps of separating the first sub-body 7 of the support body 2 from the second sub-body 8 of the support body 2 are exemplified, for example, in FIGS. 2, 3, 4 and 7. FIG. 2 illustrates the device 1, wherein the support body 2 is in the assembled condition. FIG. 3, on the other hand, illustrates the movement of separating the second sub-body 8 from the first sub-body 7 of the support body 2; the rotation movement that can be carried out to separate said portions 7, 8 is exemplified in FIG. 3. In the illustrated variant, this rotation movement has as its centre or rotation fulcrum precisely the first end 2a of the support body 2 and the collecting portion 4. According to an unillustrated variant, the support body 2 can be provided with a pin or an element positioned in an intermediate portion of the support body 2, and suitable and configured for enabling a relative rotation between the first and second portion 7, 8 about said pin. In such a case, in order to achieve a separation between the first and second portion 7, 8 of the support body 2, one end of the second sub-body 8 (preferably the end of the second sub-body 8 opposite the collecting portion 4) can be grasped and made to rotate in the plane in which the contact surface 11 lies. This separation causes the progressive detachment of the first sub-body 7 from the second sub-body 8 and in particular of the first sub-collecting portion 4a from the second sub-collecting portion 4b, with a reciprocal movement of rotation of the two sub-bodies similar to that of scissors.

In a preferred embodiment, the sub-bodies 7, 8 are half-bodies 7, 8 and the sub-collecting portions 4a, 4b are half-collecting portions 4a, 4b.

The sub-amounts of a biological sample can be half-amounts of a biological sample. Preferably, the sub- or half-collecting portions are dimensioned in such a way as to have the same sample collection capacity. In the present text, the term "sub-body" and the term "half-body" mean sub-parts or half-parts of an overall body comprising, or consisting of such sub-parts or half-parts.

During use, a sampling of biological and/or chemical material is carried out with the device 1 in an assembled condition. Preferably, the collection is carried out in such a way as to collect the sample at least on the end tip of the collecting portion, and preferably in such a way as to collect a sufficient and substantially uniform amount of a sample over the whole perimeter extent of the tip of the collecting portion, so that following the separation of the first sub-collecting portion 4a from the second sub-collecting portion 4b, said sub-collecting portions both contain a sufficient amount for independent analysis, and preferably a similar amount of the same sample. The separation between the first and second portions 7, 8 of the support body 2 and consequently between the first and second sub-collecting portions 4a, 4b is carried out following the collection of the sample of biological and/or chemical material, in a period of time that will vary according to the needs of the specific case. This separation, as will be seen in greater detail below, enables the processing of a first amount of the biological and/or chemical sample absorbed from the first sub-collecting portion 4a independently of a second amount of the biological and/or chemical sample absorbed from the second sub-collecting portion 4b. For example, the first amount of biological and/or chemical sample can be used at a first moment in time and the second amount of biological and/or chemical sample can be used at a second moment in time, even long afterwards. By way of example, the first amount of biological and/or chemical sample can be used shortly after the collection thereof (for example for testing, analysis or other laboratory uses) and the second amount of biological and/or chemical sample can be stored and used, for example for verification tests and cross-checks, at a later time (days, months or years later) after the collection thereof. The concepts herein further relate to a method for collecting and transferring of samples of biological and/or chemical material by a device of the previously described type. The method comprises the step of placing the collecting portion in contact 4 with a biological and/or chemical sample. This step is carried out in such a way that the first sub-collecting portion 4a and the second sub-collecting portion 4b respectively collect at least a first amount of the biological and/or chemical sample and at least a second amount of the biological and/or chemical sample, both amounts being sufficient to enable the subsequent analyses of the sample. The method can comprise a step of dehydrating the sample collected on the collecting portion to enable better storage of the sample, avoiding the proliferation of fungi and mould which can damage the sample and render it unusable for successive analysis.

The method thus comprises a step of separating the second sub-body 8 of the support body 2 from the first sub-body 7 of the support body 2. This step causes the separation of the second sub-collecting portion 4b containing the second amount of biological and/or chemical sample at least from the first sub-collecting portion 4a containing the first amount of biological and/or chemical sample. At this point, at least a part of the first amount of the biological and/or chemical sample is extracted from the first sub-collecting portion 4a in order to enable operations of analysis to be performed on the biological and/or chemical sample at a first moment in time and the second amount of the biological and/or chemical sample on the second sub-collecting portion 4b is stored for a future use following the first moment in time, or vice versa. In order to enable correct storage of the sample of biological and/or chemical material, the first amount of the biological and/or chemical sample absorbed from the first sub-collecting portion 4a and/or the second amount of the biological and/or chemical sample absorbed from the second sub-collecting portion 4b can be stored in suitable containers or test tubes 6 and can be preferably dehydrated, for example by a dehydrating element contained in the gripping portion 5. The first and the second sub-collecting portion 4a, 4b can be entirely stored with the respective portions 7, 8 of the support body 2 or be separated from them to allow storage in containers of reduced size. For example, the first sub-body 7 of the support body 2 can be stored in a test tube 6 such as the one illustrated in FIG. 1, whereas the second sub-collecting portion 4b can be detached from the intermediate portion of the second sub-body 8 by a controlled breakage of the weakened portion 9, and be inserted into an Eppendorf-type test tube 6a, as illustrated in FIG. 5, to enable the sample to be extracted and subsequent tests to be performed on the sample.

The concepts herein further relate to a process for manufacturing the previously described device 1. The process envisages that the first and the second sub-body 7, 8 of the support body 2 be made separately. They are preferably made by moulding, and even more preferably by injection moulding. The first sub-body 7 is subsequently engaged with the second sub-body 8 by a removable coupling, for example in the form of engaging elements 10; at this point, the support body 2 is in the assembled condition. After the assembly of the support body 2, an amount of adhesive material (for example glue) is applied to the first end 2a of the support body 2. Alternatively, it is possible to apply the fibre without using glue, by heating the material that forms the support body 2. The process then envisages making a collecting portion 4, preferably flocked, at said end 2a of the support body 2. However, as said previously, other types of collecting portions 2 can be provided. Further steps, of a known type and thus not described in detail, of finishing, treatment and completion of the device can moreover be envisaged.

The concepts herein enable one or more of the following advantages to be obtained. Firstly, the concepts herein are able to provide a device, a process for manufacturing of the device, a method for collecting and transferring samples of biological and/or chemical material and a use of the device capable of overcoming the problems found in the prior art. In particular, the concepts herein further enable swabs to be made which simplify the obtainment of a sufficient amount of sample to be analysed for immediate analysis and for future use. The concepts herein further enable the collection, transfer and storage of samples of biological and/or chemical material to be simplified. The concepts herein further enable a high degree of traceability and correct storage of the biological material to be guaranteed, even for long periods, above all, but not only, for forensic use. In particular, the concepts herein make it possible to have the certainty that the samples analysed at a later time will be exactly the same, as they derive from a single sample collection and the related handling is reduced to a minimum; therefore, the risks of performing the test on different samples, or of contaminating the same are very limited. The concepts herein further make it possible to reduce handling of the sample and significantly reduce the risk of contaminating the collected samples and the environments involved. The concepts herein further make it possible to increase the efficiency, safety and reliability of the processes of treating the biological material collected. The swabs according to the concepts herein are further very convenient to use, as well as being highly reliable and safe to use. Finally, the concepts herein are simple and economical to implement.

The invention claimed is:

1. A device for collecting, transferring and storing samples of biological and/or chemical material, the device comprising a support body extending along a main longitudinal direction between a first end and a second end opposite each other and connected by an intermediate portion, and a collecting portion engaged at least with the first end of the support body and configured to collect an amount of a sample of biological and/or chemical material, the support body being defined by at least a first sub-body and a second sub-body which are distinct from each other and can be selectively coupled so as to define an assembled condition of the support body and selectively separated from each other, so as to define a disassembled condition of the support body, and wherein the collecting portion is made and engaged both on a first end of the first sub-body and on a first end of the second sub-body, and is selectively separable, as a result of a separation of the first sub-body from the second sub-body, so as to define two sub-collecting portions made on the first sub-body and on the second sub-body, respectively; wherein both the collecting portion and the two sub-collecting portions are made on, and engaged with, the first end of the support body, wherein the first and the second sub-body have respective engaging elements configured to ensure the engagement between the first and the second sub-body in the assembled condition of the support body and wherein the engaging elements are arranged in at least two distinct sections of the first and of the second sub-body.

2. The device according to claim 1, wherein said sub-bodies are half-bodies and wherein said sub-collecting portions are half-collecting portions.

3. The device according to claim 1, wherein, in the assembled condition, the two sub-bodies are mutually coupled and the two sub-collecting portions are mutually joined so as to define the collecting portion.

4. The device according to claim 1, wherein the collecting portion defined by the two sub-collecting portions, in the assembled condition, is one single piece.

5. The device according to claim 1, wherein the two sub-collecting portions, in the assembled condition, are adjacent and contiguous to each other so as to define the collecting portion.

6. The device according to claim 1, wherein the first sub-body and the second sub-body both extend at least along the first end of the support body and/or at least from the first end of the support body to the intermediate portion of the support body and/or at least from the first end of the support body to the second end of the support body.

7. The device according to claim 1, wherein the first sub-body and the second sub-body both extend longitudinally along said main longitudinal direction, at least at a part of the collecting portion or at least at the entire longitudinal extent of the collecting portion.

8. The device according to claim 1, wherein the two sub-collecting portions substantially comprise the same amount of absorbing material and/or form two substantially identical and/or specular halves of the collecting portion.

9. The device according to claim 1, wherein the support body has a central axis of longitudinal extension extending according to the main longitudinal direction, and wherein the first and the second sub-body are configured to be selectively separable and coupled on respective contact surfaces comprising the central axis of longitudinal extension, or on respective flat contact surfaces comprising the central axis of longitudinal extension.

10. The device according to claim 1, wherein the first sub-body and the second sub-body are selectively coupled and are separable according to an assembling direction perpendicular to the main longitudinal direction.

11. The device according to claim 1, wherein the collecting portion comprises an absorbing material and/or wherein the collecting portion is configured to absorb the biological and/or chemical sample by capillarity.

12. The device according to claim 1, wherein the collecting portion comprises a layer of flocked fibre made by a fibre flocking process on the first end.

13. The device according to claim 1, wherein the first and the second sub-body have a removable coupling capable of enabling selective engagement and disengagement.

14. The device according to claim 1, wherein the engaging elements are arranged in three distinct sections of the first and of the second sub-body, and/or wherein the engaging elements are arranged at least in the intermediate portion and/or at least at the first and/or the second end and/or at least near the collecting portion.

15. The device according to claim 1, wherein the first and the second sub-body both extend for a length that is analogous or substantially equal to a length of the support body, or wherein the first sub-body has a length that is shorter than the overall length of the support body or a length equal to the collecting portion and the second sub-body has a length equal to the overall length of the support body, or wherein the first sub-body has a shorter length than the collecting portion and comprises the terminal part of the first end of the support body, and wherein the second sub-body has a length that is shorter than the overall length of the support body and corresponds to the remaining part of the length of the support body, so that the sum of the length of the first and of the second sub-body determines the overall length of the support body.

16. The device according to claim 1, wherein the first and the second sub-body are made separately as distinct elements by injection moulding and/or wherein the first and the second sub-body have a removable coupling means capable of enabling selective engagement and disengagement and the removable coupling or the engaging elements are made as one piece on the first and/or on the second sub-body by injection moulding while the sub-bodies themselves are being made.

17. A method for collecting, transferring and storing samples of biological and chemical material, for forensic purposes and/or from crime scenes, or for environmental sampling, or for collecting samples from a human or animal body and/or from a human or animal orifice, in particular for collecting samples from the mouth, pharynx, nasal cavity, eyes, urethra, vagina, anus, rectum, or skin, by a device according to claim 1, the method comprising at least the following steps:
   placing at least the first sub-collecting portion and the second sub-collecting portion of the device in contact with a biological and/or chemical sample in such a manner and for such a time as to collect at least an amount of said sample on said collecting portion, thereby collecting a first sub-amount of said biological sample on the first sub-collecting portion and at least a second sub-amount of said biological sample on the second sub-collecting portion of the collecting portion of the device;
   separating the second sub-body of the support body from the first sub-body of the support body, thus causing the separation of the second sub-collecting portion containing the second sub-amount of biological sample at least from the first sub-collecting portion containing the first sub-amount of biological sample.

18. The device according to claim 1, wherein the engaging elements comprise one or more housing seats formed at least on the first sub-body and one or more protrusions formed at least on the second sub-body, or vice versa, each protrusion being suitable for being engaged inside a respective housing seat in the assembled condition of the support body.

19. A process for manufacturing a device for collecting, transferring and storing samples of biological and/or chemical material, the process comprising at least the steps of:
   making a first sub-body of a support body of the device having respective engaging elements arranged in at least two distinct sections of the first sub-body,
   making a second sub-body of the support body of the device, distinct from the first sub-body, having respective engaging elements arranged in at least two distinct sections of the second sub-body and configured to ensure the engagement between the first and the second sub-body in an assembled condition of the support body;
   engaging the first sub-body with the second sub-body, by engaging the respective engaging elements, so as to obtain a support body in an assembled condition, and
   making a collecting portion at a first end of the support body, the collecting portion comprising two sub-collecting portions which are mutually joined and associated with the first sub-body and the second sub-body, respectively.

* * * * *